April 12, 1949.  E. STEWART  2,466,917
PARKING BRAKE

Filed May 14, 1946  2 Sheets-Sheet 1

INVENTOR.
EARLE STEWART
BY
Donald W. Farrington
ATTORNEY

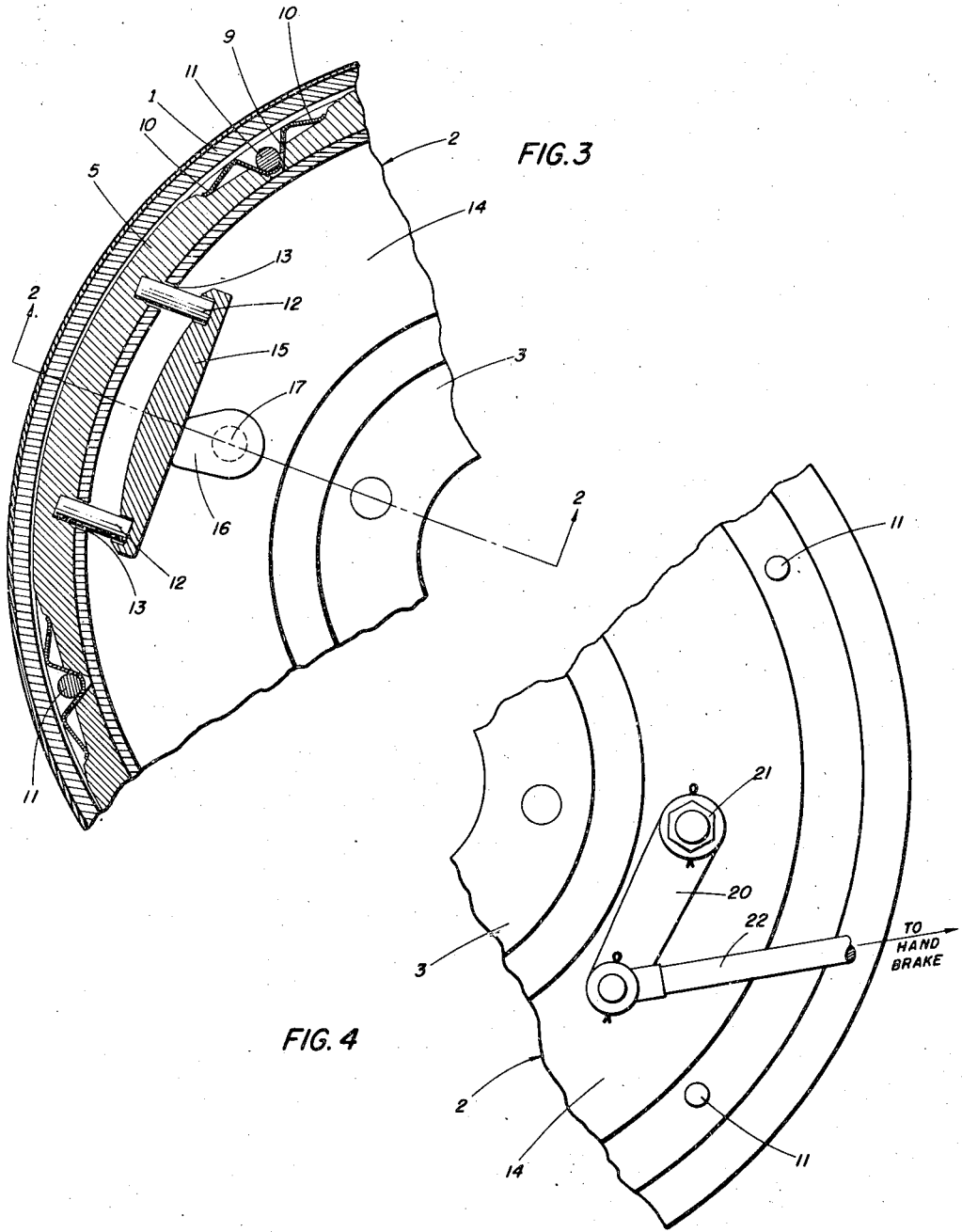

Patented Apr. 12, 1949

2,466,917

UNITED STATES PATENT OFFICE 2,466,917

PARKING BRAKE

Earle Stewart, Baltimore, Md., assignor to The Glenn L. Martin Company, Middle River, Md., a corporation of Maryland Application May 14, 1946, Serial No. 669,532

6 Claims. (Cl. 188—106)

This invention relates to an improved hydraulic brake and more particularly to the structural adaptation of a multi-block expander brake to provide a parking brake. The features of the brake block mounting and expander mechanism are described in detail in Patent No. 2,390,311 issued December 4, 1945, and in co-pending applications Serial No. 627,917, filed November 10, 1945 and application Serial No. 627,918, filed November 10, 1945.

The brake herein described is of a class generally referred to as hydraulic brakes, in that the actuating mechanism is operated by a hydraulic fluid pressure. In brakes of this type, it is necessary that the brake blocks be forced against the brake drum with enough force to stop the rotation of the drum which is usually mounted on the wheel of a vehicle, within a predetermined time and with a minimum of lag between the actuation of the brake pedal and the application of the braking force of the brake block on the brake drum. This is accomplished by some sort of an actuator, or mechanism for transforming hydraulic pressure into mechanical thrust on the brake blocks. This hydraulic brake is employed for dynamic braking, that is, slowing up a rotating wheel and bringing a vehicle to rest. Such brakes are not designed to maintain the pressure to provide continuous braking action for a parking brake on a vehicle. It is, therefore, necessary to provide an auxiliary brake on vehicles, such as a separate brake on the drive shaft of a car or some adaptation of the wheel brakes to provide a parking brake. It is not difficult to adapt the conventional two shoe hydraulic brake but the provision of a parking brake on the multi-block brake presented somewhat of a problem.

An object of this invention is the improvement of the multi-block hydraulic brake structure to provide a parking brake by the provision of structure to actuate at least one block of a multi-block brake, to engage the drum on the wheel to provide a parking brake.

Further and other objects will become apparent from the description of the accompanying drawings which form a part of this disclosure and in which like numerals refer to like parts.

In the drawings:

Figure 3 is a fragmentary sectional view of the brake showing the block actuator for a parking brake or for static braking of the wheel, taken on the line 3—3 of Figure 2.

Figure 4 is a fragmentary view of the opposite side of the brake actuator showing the operating lever.

Figure 1:
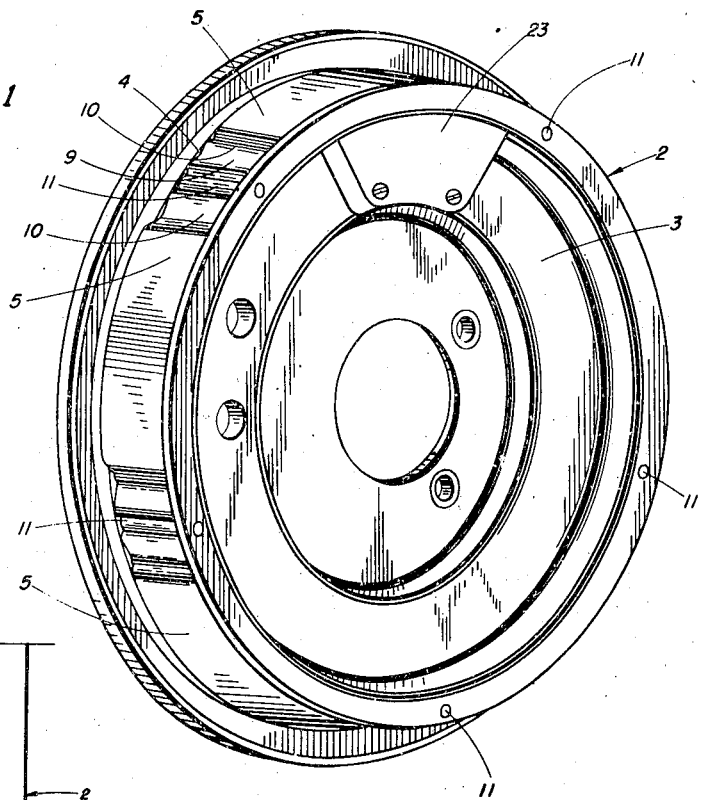
Figure 1 is a view of the brake actuator assembly.

The brake actuator shown in Figure 1 is adapted to be attached to a flange on the axle of the wheel of any vehicle. In the usual application, a brake drum 1 will be mounted on the wheel of the vehicle and fit over the brake actuator generally indicated as 2, in the conventional manner. The brake actuator consists of a mounting member 3 having an annular channel 4 formed in the periphery thereof to receive the brake blocks 5 and support the brake block expander mechanism.

Figure 2:
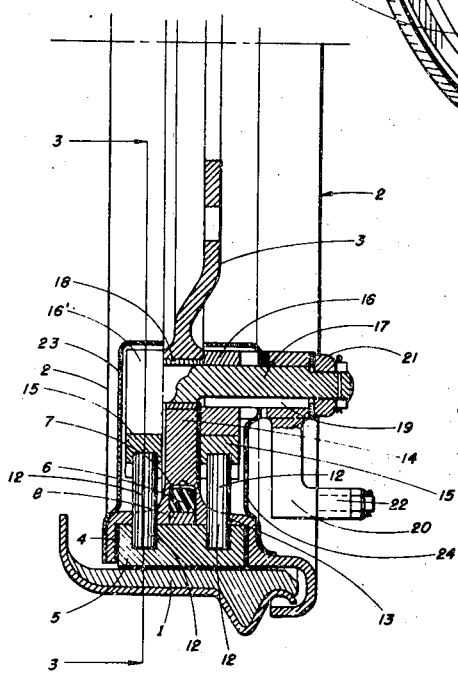
Figure 2 is a sectional view of the brake taken on the line 2—2 of Figure 3.

As shown in Figure 2, brake blocks 5 fit into channel 4 with a sliding fit between the side walls of the channel and the edges of the block. As described in the co-pending applications mentioned above, brake blocks 5 are moved radially by hydraulic pressure acting upon a resilient annular gasket 6. This gasket is mounted in groove 7. The side walls of groove 7 are substantially parallel or may be formed with a slight taper. Thrust members 8 form a segmental ring that extends around the groove between the resilient gasket 6 and the brake blocks 5. The fluid pressure in groove 7 is controlled in the conventional manner by a brake pedal to expand the resilient gasket 6 and thrust member 8 moves radially to force brake blocks 5 against the brake drum. It can be seen, therefore, from a consideration of Figures 1 and 2 that a brake mounting and actuator is provided wherein a plurality of brake blocks are mounted in a channel around the periphery of a brake actuator which are forced radially outwardly by means of hydraulic fluid pressure.

The adjacent ends of the brake blocks are retained in place by leaf springs 9 which have portions 10 formed to act as return springs for the ends of the blocks. Pin 11 extends transversely of the channel and retains spring 9.

The resilient gasket 6 is of a synthetic rubber or elastomeric material which has the physical properties of rubber but it also has the ability to resist the action of oil or oil compounds that may be used as hydraulic fluid. As the hydraulic fluid pressure in groove 7 is increased, the gasket 6 is deformed to exert a large radial force against the thrust members which is transmitted to the brake blocks, and secondary forces which are exerted laterally of the seal to prevent the escape of hydraulic fluid along the edges of the gasket.

Brake blocks 5 may be of any brake block material which affords efficient braking action against the drums when urged outwardly. These brake blocks may be molded to form the ends of the proper shape and contour for immediate installations. Except for the portion occupied by the return springs, they extend around the whole periphery of the brake actuator and brake drum. Brake blocks 5 have a thrust member 8 extending into groove 7 between gasket 6 and the blocks 5.

To provide a parking brake on the above described hydraulic brake, it is merely necessary to include structure that can be actuated to move one of the brake blocks into firm engagement with the brake drum to prevent rotation between the wheel and drum, and the brake actuator mount assembly. Such structure is shown in Figures 2, 3 and 4. Brake block 5 has four pins 12 mounted therein that extend through apertures 13 in the bottom of channel 4 on each side of the web 14 of mounting member 3. Members 15 engage the ends of pins 12. Cams 16 and 16' are mounted on shaft 17 which turns in bearing 18. Cam 16' is shown formed integrally with shaft 17 and cam 16 is keyed to shaft 17 by key 19. A lever 20 is also keyed to shaft 17, and the assembly of cams and lever 20 on shaft 17 is retained by nut 21. A brake rod 22 is pivotally secured to the other end of lever 20.

It can be seen from this description that as brake rod 22 is moved by the hand lever of the parking brake, lever 20 is rotated to rotate shaft 17 and the cams 16 and 16' mounted thereon. The cams move members 15 in unison which through pins 12, move block 5 into engagement with the drum. Portions 10 of spring 9 which act to retain the blocks, also act to return the blocks when the hand brake is released. Covers 23 and 24 are provided as dust covers to protect the parking brake actuator mechanism.

Moving one brake block of a multi-block brake is usually sufficient but it should be understood that several blocks may be actuated by linkages with lever 20 if desired.

It is to be understood that certain changes, alterations, modifications and substitutions can be made without departing from the spirit and scope of the appended claims.

I claim as my invention:

1. In a brake of the class described having a brake drum, a plurality of brake blocks adapted to be moved radially by fluid pressure into contact with said drum, an actuator and mount for said brake blocks, comprising a cylindrical member having at least one relatively narrow annular groove in the periphery thereof, said brake blocks having a rib secured to the side adjacent said member filling said groove and adapted to engage the walls of said groove with a sliding fit, means forming a passage interconnecting said groove with a source of fluid pressure, resilient elastic gasket means in said groove in contact with the side walls thereof and said rib member whereby said fluid pressure urges said gasket bodily, radially to force said brake blocks against said brake drum and separate means secured to said mount, spanning said narrow groove, to move at least one of said brake blocks into contact with said brake drum to prevent relative motion between said brake drum and said actuator and mount.

2. In a brake of the class described including a brake drum and a brake actuator comprising a mounting member having an outwardly opening channel-shaped rim, a plurality of radially movable brake blocks supported in said channel extending around the periphery thereof, spring members positioned in said channel member transverse of said brake blocks, said spring members having portions engaging the ends of said brake blocks to restrain said blocks upon radial movement thereof, fluid pressure actuating means for moving all of said brake blocks radially outwardly into engagement with said drum for dynamic braking and cam actuated means to move at least one of said brake blocks independently of said fluid pressure actuated means into engagement with said drum for static braking of said drum.

3. In a brake of the class described having a brake drum, a plurality of brake blocks adapted to be moved radially by fluid pressure into contact with said drum, an actuator and mount for said brake blocks, comprising a cylindrical member having at least one relatively narrow annular groove in the periphery thereof, said brake blocks having a rib secured to the side adjacent said member filling said groove and adapted to engage the walls of said groove with a sliding fit, means forming a passage interconnecting said groove with a source of fluid pressure, resilient gasket means in said groove in contact with the side walls thereof and said rib member whereby said fluid pressure urges said gasket bodily, radially to force said brake blocks against said brake drum and cam actuated means secured to said mount, spanning said narrow groove, to move at least one of said brake blocks into contact with said brake drum to prevent relative motion between said brake drum and said actuator and mount.

4. In a brake of the class described having a brake drum, a plurality of brake blocks adapted to be moved radially by fluid pressure into contact with said drum, an actuator and mount for said brake blocks, comprising a cylindrical member having at least one relatively narrow annular groove in the periphery thereof, said brake blocks having a rib secured to the side adjacent said member filling said groove and adapted to engage the walls of said groove with a sliding fit, means forming a passage interconnecting said groove with a source of fluid pressure, resilient elastic gasket means in said groove in contact with the side walls thereof and said rib member whereby said fluid pressure urges said gasket bodily, radially to force said brake blocks against said brake drum, means extending through said cylindrical member spanning said narrow groove to engage at least one of said brake blocks, and means to actuate said block engaging means radially, independently of said fluid pressure actuated resilient elastic gasket means, to lock said drum and said block to prevent relative motion between said brake drum and said mount.

5. In a brake of the class described having a brake drum, a plurality of brake blocks adapted to be moved radially by fluid pressure into contact with said drum, an actuator and mount for said blocks, comprising a cylindrical member having at least one relatively narrow annular groove in the periphery thereof, said brake blocks having a rib secured to the side adjacent said member filling said groove and adapted to engage the walls of said groove with a sliding fit, means forming a passage interconnecting said groove with a source of fluid pressure, resilient elastic gasket means in said groove in contact with the side walls thereof and said rib member whereby said fluid pressure urges said gasket bodily, radially to force said brake blocks against said brake drum, push rods extending through said cylindrical member on each side of said narrow groove, to engage at least one of said brake blocks, and cam means to actuate said push rods radially independently of said fluid pressure actuated resilient elastic gasket means, to lock said drum and said block to prevent relative motion between said brake drum and said mount.

6. In a brake of the class described having a brake drum, a plurality of brake blocks adapted to be moved radially by fluid pressure into contact with said drum, an actuator and mount for said brake blocks, comprising a cylindrical member having at least one relatively narrow annular groove in the periphery thereof, said brake blocks having a rib secured to the side adjacent said member filling said groove and adapted to engage the walls of said groove with a sliding fit, means forming a passage interconnecting said groove with a source of fluid pressure, resilient elastic gasket means in said groove in contact with the side walls thereof and said rib member whereby said fluid pressure urges said gasket bodily, radially to force said brake blocks against said brake drum, means extending through said cylindrical member to move at least one of said brake blocks radially independently of said fluid pressure actuated resilient elastic gasket means, to prevent relative motion between said brake drum and said mount.

EARLE STEWART.

REFERENCES CITED

The following references are of record in the file of this patent:

UNITED STATES PATENTS

| Number | Name | Date |
|---|---|---|
| 2,093,996 | Botnen | Sept. 28, 1937 |
| 2,390,311 | Kupiec | Dec. 4, 1945 |